Feb. 13, 1940.  A. D. SUND  2,190,089
ANIMAL TRAP
Filed Dec. 13, 1937
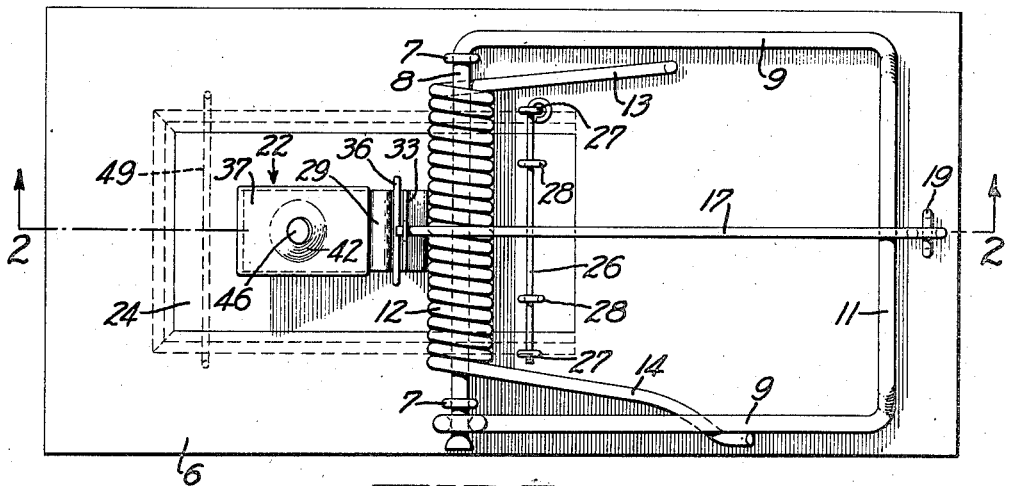
INVENTOR
Alfred D. Sund
BY Harry G. Schroder
ATTORNEY Patented Feb. 13, 1940

2,190,089

UNITED STATES PATENT OFFICE 2,190,089

ANIMAL TRAP

Alfred D. Sund, Santa Rosa, Calif.

Application December 13, 1937, Serial No. 179,479

5 Claims. (Cl. 43—81)

This invention relates to animal traps of the type particularly adapted, and commonly used, in the capture of rodents such as mice and rats.

It is an object of the invention to provide an improved bait holder for such a trap which eliminates the possibility of the animal removing the bait without springing the trap.

Another object of the invention is to provide an improved trigger for the trap which greatly increases its sensitivity.

A further object of the invention is to provide an animal trap possessed of greatly increased efficiency of operation over similar types of traps in general use which may be produced at an inappreciable increase in manufacturing cost over that of the latter type of trap.

The invention possesses other objects and features of advantage, some of which, together with the foregoing, will be specifically set forth in the detailed description of the invention hereunto annexed. It is to be understood that the invention is not to be limited to the particular species thereof shown and described as various other embodiments thereof may be employed within the scope of the appended claims.

Referring to the drawing:

Figure 1 is a top plan view of the complete animal trap of my invention.

Figure 2 is a vertical sectional view of the structure shown in Figure 1, the plane of section being indicated by the line 2—2 in the latter figure.

Figures 3 and 4 are, respectively, perspective views of different forms of bait holders.

Although the most familiar type of rodent trap, comprising a wooden base surmounted by a spring-tensioned jaw which is pivoted on the base and snaps from an open position to a closed position to pinion the rodent to the base when it touches a baited release trigger, has long been in public favor and is conceded to be the most successful trap for its purpose, it possesses one serious weakness which prevents its most efficient operation. This deficiency centers around the bait trigger frictionally engaging the distal end of the jaw release rod which is pivotally connected at its proximal end to the base and serves to hold the tensioned trap jaw in its open position. Due to the great strength of the trap jaw spring, which is necessary to snap the jaw shut after the trap is sprung so that the agile animal will not have time to escape, the frictional pressure exerted by the release rod on the portion of the trigger which it engages is considerable, sometimes requiring the exertion of abnormal pressure on the trigger before the trap will be sprung. Traps set in such a manner are useless for it has been found that almost invariably the animal may eat the bait without being in any danger of capture. The user, after once finding the trap stripped of bait without being sprung, next sets the trap with a "light" trigger, that is, the trigger is engaged with the release rod very close to the free end of the latter so that only slight movement of the trigger is required to release the connection. In a great number of cases traps set in this manner will be found to have tripped prematurely due to vibrations transmitted through the ground or the building causing the delicate engagement of the trigger and release rod to break. I have, to a great extent, eliminated these undesirable features by providing a multiple trigger for traps which produces the desired degree of sensitiveness without requiring any special setting of the trigger and by providing a bait holder which renders it impossible for the bait to be removed by the animal without setting off the trap.

In detail, the trap comprises the usual rectangular, preferably wooden, base 6 provided intermediate its ends with a pair of staples 7 which form journals for the pivotally mounted trap jaw comprising an axle 8, which is journaled in the staples 7, a pair of parallel arms 9 and a cross bar 11. The trap jaw is preferably made of a single piece of rod as shown but may be composed of separate sections welded, or otherwise secured, together. A coiled torsion spring 12 is concentric with and surrounds the axle 8 and is provided at one end with an extension 13, which is anchored to the base 6, and at the other end with an extension 14 whose outer end is in engagement with one of the trap jaw arms 9. The function of the spring 12 is to snap the trap jaw from its open position, shown by the solid lines in Figure 2, to its closed position as indicated by the dotted lines 16. The usual release rod 17 having at one end a closed loop 18, which engages a staple 19 secured in the base so as to pivotally mount the rod on the base, is provided overlying and engaging the trap jaw to maintain the latter in its open position, and the opposite end 21 of the release rod is releasably connected to the bait trigger generally indicated by the numeral 22.

In the base 6, in the area thereof below the bait trigger, is provided an opening 23 having upwardly converging sides and one end and in the opening is positioned a movable platform 24 having sides and one end sloped in conformity with those of the opening so that the platform is restrained from movement upwardly beyond the upper surface of the base, but is free to move in the opening toward the bottom surface of the base. One end of the platform is pivotally connected to the base by means of an axle 26 whose opposite ends are secured by staples 27 to the base and whose medial portion is straddled by staples 28 secured in and adjacent one end of the platform. It is on this movable platform that the bait trigger is mounted, the latter comprising a strip of sheet material formed to provide a bait arm 29 having a depression 31 therein, a doubled over portion which provides a foot 32 resting on the surface of the platform and an upwardly extending arm 33 having an aperture or notch 34 therein in which the end 21 of the release rod is engaged. The trigger is pivotally mounted on the platform by means of a wide staple 36.

It has been the practice heretofore to tie a piece of bait to the arm 29. This has proven unsatisfactory for more than one reason. In the first place, frangible material such as cheese is very likely to break when first nibbled at by the animal and fall from the trigger whereupon it may be eaten without any danger of springing the trap unless the animal accidentally brushes against the trigger. In the second place, since the whole of the bait is exposed, the animal is likely to eat from the bottom of the bait upwardly, thus imposing an upward pressure on the bait trigger which only tends to set the latter more securely. I have provided a bait holder which permits access to the bait only from the top of the trigger, thereby insuring that the first nibble of the animal will produce the desired downward pull on the trigger sufficient to free the end of the release rod and spring the trap.

In Figures 3 and 4 are shown two forms of bait holder each comprising a plate 37 having at both longitudinal edges and one end thereof inturned flanges 38 which provide, respectively, guideways 39 which permit the plate to be slipped over the bait arm 29 as shown in Figures 1 and 2, and a stop 41 which contacts the distal end of the bait arm to limit the degree of engagement of the plate therewith. The plate is provided with a centrally located protuberance 42 which forms a depression 43 in the underside of the plate registrable with the depression 31 of the bait arm to form a chamber 44. This chamber forms the receptacle for the bait, it being apparent that when material such as cheese is placed in each of the depressions 31 and 43 and the plate 37 is slipped onto the bait arm the chamber 44 will be full. In the protuberance 42 is provided an aperture 46 through which a quantity of bait in the chamber 44 may protrude. An elongated aperture 47 is shown in the modified form of bait holder illustrated in Figure 4, the reason for which will be presently described.

When an animal approaches the trap, set as it is shown in Figure 2, it must climb onto the base 6 in order to reach the bait, since the only exposed portion of the latter is on top of the bait trigger, and in so doing is quite likely to place its feet on the platform 24 thereby causing the platform to swing downwardly toward the position indicated by the dotted lines 48 and release the end of the rod 17 from the aperture 34 which will spring the trap. The downward movement of the platform is limited by a rod 49 spanning the aperture 23. It will be seen therefore that the trap may be sprung even before the animal reaches the bait. If, however, the animal does not impose any of its weight on the platform, its efforts to dig the bait out of the chamber through the aperture thereof will surely release the trigger. The elongated aperture, shown in the modification of Figure 4, invites the animal to claw the bait out of the bait chamber thereby creating the desired downward pressure on the bait trigger sufficient to trip it.

The improved trap of my invention just described has proven, under actual working conditions, more sensitive than ordinary traps of a like character, incapable of being stripped of bait without being set off, easier to load with bait than the usual trap in which the bait must be tied on, and, although being quite sensitive, may be handled after being set without danger of inflicting injury to the person handling it due to being accidentally set off.

I claim:

1. An animal trap comprising a base having an opening therein, a member within said opening and pivotally connected at one end thereof to said base, powered mechanism on said base adapted to be set to ensnare an animal and including a releasable element overlying said member, a trigger pivotally mounted on said member and having an arm releasably engaged with said releasable element and a bait arm, and means slidably engaged with said bait arm for attaching a quantity of bait thereto.

2. An animal trap comprising a base having an opening therein, a member within said opening and pivotally connected at one end thereof to said base, powered mechanism on said base adapted to be set to ensnare an animal and including a releasable element overlying said member, a trigger pivotally mounted on said member and having an arm releasably engaged with said releasable element and a bait arm, said bait arm having a depression therein, and a plate having a depression therein, and an aperture communicating with said latter depression, slidably engageable with said bait arm to position both of said depressions in relative registry to provide a hollow chamber in which a quantity of bait may be placed.

3. An animal trap comprising a base having a spring-pressed trap jaw pivotally mounted thereon and movable from a set position to an unset position, a platform pivotally mounted on said base, a trap jaw release rod pivotally mounted at one end thereof on said base, said release rod, when the trap jaw is in set position, overlying said trap jaw and having its free end overlying said platform, and a bait trigger comprising a lever pivotally mounted on said platform and releasably engaging said trap jaw release rod.

4. An animal trap comprising a base having a spring-pressed trap jaw pivotally mounted thereon and movable from a set position to an unset position, a platform pivotally mounted on said base, a trap jaw release rod pivotally mounted at one end thereof on said base, said release rod, when the trap jaw is in set position, overlying said trap jaw and having its free end overlying said platform, a bait trigger comprising a lever pivotally mounted on said platform and releasably engaging said trap jaw release rod, and a bait holder comprising a member removably engageable with said bait trigger and having a portion thereof spaced with respect to a portion of the bait trigger to provide a hollow chamber for containing a quantity of bait.

5. In an animal trap having a release element, a bait trigger comprising a movable lever releasably engaging said release element, and a bait holder comprising a member slidably engageable with said bait trigger and spaced in a portion thereof relative thereto to provide a hollow chamber for containing a quantity of bait and enclosed by a continuous wall formed by respective adjacent portions of the bait holder and bait trigger, and said chamber wall having therein an aperture through which a quantity of said bait is exposed.

ALFRED D. SUND.